(12) United States Patent
Sawada et al.

(10) Patent No.: US 9,203,273 B2
(45) Date of Patent: Dec. 1, 2015

(54) ROTATING ELECTRICAL MACHINE

(75) Inventors: Itsuro Sawada, Hitachinaka (JP);
Kenichi Nakayama, Hitachinaka (JP);
Tomoaki Kaimori, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 827 days.

(21) Appl. No.: 13/387,055

(22) PCT Filed: Jul. 30, 2010

(86) PCT No.: PCT/JP2010/062923
§ 371 (c)(1),
(2), (4) Date: Mar. 15, 2012

(87) PCT Pub. No.: WO2011/013809
PCT Pub. Date: Feb. 3, 2011

(65) Prior Publication Data
US 2012/0161555 A1 Jun. 28, 2012

(30) Foreign Application Priority Data
Jul. 30, 2009 (JP) ................................. 2009-178119

(51) Int. Cl.
*H02K 3/24* (2006.01)
*H02K 3/50* (2006.01)
*H02K 3/52* (2006.01)
*H02K 9/19* (2006.01)

(52) U.S. Cl.
CPC .. *H02K 3/24* (2013.01); *H02K 3/50* (2013.01); *H02K 3/522* (2013.01); *H02K 9/19* (2013.01)

(58) Field of Classification Search
CPC ........... H02K 3/24; H02K 3/522; H02K 3/50; H02K 9/19
USPC ........................................................ 310/54, 89
See application file for complete search history.

(56) References Cited

U.S. PATENT DOCUMENTS

| 3,109,947 A * | 11/1963 | Thompson et al. ............. 310/64 |
| 4,797,588 A * | 1/1989 | Capion ............................ 310/54 |
| 8,378,550 B2 * | 2/2013 | Bradfield ....................... 310/260 |
| 2001/0040415 A1 | 11/2001 | Asao et al. |
| 2004/0222710 A1 * | 11/2004 | Kashihara et al. .............. 310/43 |
| 2007/0278869 A1 * | 12/2007 | Taketsuna ....................... 310/54 |

(Continued)

FOREIGN PATENT DOCUMENTS

| JP | 62-293952 A | 12/1987 |
| JP | 2001-119883 A | 4/2001 |
| JP | 2004-40924 A | 2/2004 |

(Continued)

OTHER PUBLICATIONS

JP 2005012961 A machine translation.*

(Continued)

*Primary Examiner* — Hanh Nguyen
*Assistant Examiner* — Leda Pham
(74) *Attorney, Agent, or Firm* — Crowell & Moring LLP

(57) ABSTRACT

A rotating electrical machine includes: a stator that includes a stator core and a stator coil; a rotor that rotates with respect to the stator; a refrigerant supply port through which a cooling medium is supplied to a coil end protruding from the stator core; and a guide member, disposed along at least a part of the coil end, for causing the cooling medium supplied through the refrigerant supply port to flow along the coil end.

7 Claims, 20 Drawing Sheets

(56) References Cited

U.S. PATENT DOCUMENTS

| | | | |
|---|---|---|---|
| 2009/0127964 A1* | 5/2009 | Yumoto et al. | 310/195 |
| 2009/0184592 A1 | 7/2009 | Sano et al. | |

FOREIGN PATENT DOCUMENTS

| JP | 2004-215358 A | | 7/2004 | |
| --- | --- | --- | --- | --- |
| JP | 2005-12961 A | | 1/2005 | |
| JP | 2005012961 A | * | 1/2005 | ............... H02K 9/19 |
| JP | 2005-130588 A | | 5/2005 | |
| JP | 2005-253263 A | | 9/2005 | |
| JP | 2005-323416 A | | 11/2005 | |
| JP | 2005323416 A | * | 11/2005 | ............... H02K 9/19 |
| JP | 2006-5984 A | | 1/2006 | |
| JP | 2006-33915 A | | 2/2006 | |
| JP | 2006-197772 A | | 7/2006 | |
| JP | 2006-311750 A | | 11/2006 | |
| JP | 2007-336677 A | | 12/2007 | |
| JP | 2007336677 A | * | 12/2007 | |

OTHER PUBLICATIONS

JP 2005323416 A machine translation Mar. 21, 2015.*
International Search Report with English translation dated Nov. 2, 2010 (five (5) pages).

* cited by examiner

ROTATING ELECTRICAL MACHINE

TECHNICAL FIELD

The present invention relates to a cooling structure of a rotating electrical machine.

BACKGROUND ART

A rotating electrical machine that is mounted on a hybrid electric vehicle, an electric vehicle, and the like includes a rotor and a stator that is arranged at an outer diameter side of the rotor on which a stator coil is wound.

For giving driving force to the vehicle by the rotating electrical machine, electrical current is passed through the stator coil so as to give rotational force to the rotor. In addition, when generating electric power by the rotating electrical machine, current generated at the stator coil by rotation of the rotor is obtained.

At this time, heat is generated at the stator coil and the stator core due to loss in the rotating electrical machine. Insulation material used for the rotating electrical machine has an upper temperature limit to assure insulation performance, and the rotating electrical machine needs to be cooled so as not to exceed the temperature limit.

There are two types of cooling methods to cool rotating electrical machines, i.e., an air cooling method in which air is used as a cooling medium and a liquid cooling method in which liquid is used as a cooling medium. There are two types of liquid cooling methods, i.e., an indirect cooling method in which cooling liquid is caused to flow through a liquid cooling jacket provided at an outer diameter side of the stator core and the like so as to perform cooling through the liquid cooling jacket and a direct cooling method in which an insulating liquid such as oil is directly applied to a heat generating region of the rotating electrical machine such as the stator coil so as to cool the region.

The direct cooling method allows the overall size of the rotating electrical machine to be reduced because no liquid cooling jacket is needed and also has an excellent cooling performance because a cooling medium can be directly applied to a heat generating region, so that the direct cooling method is adopted in a multitude of rotating electrical machines.

Patent Literature 1, for example, discloses a cooling system in which a cooling medium passage is provided on an outer circumference side of a stator and a cooling medium is spouted from an outlet port bored in the cooling medium passage to a stator coil end, so that a coil is cooled by the cooling medium flowing on the surface of the stator coil end due to jet pressure and gravity.

CITATION LIST

Patent Literature
    [PATENT LITERATURE 1] Japanese Laid-Open Patent Publication No. 2005-253263

SUMMARY OF INVENTION

Technical Problem

However, in the cooling system of Patent Literature 1, a part of the cooling medium is removed along the way from the coil surface due to vibration and gravity and thus does not contribute to cooling. In other words, a difference in cooling performance occurs depending upon a circumferential position of the coil end, so that coil temperature may rise locally.

Solution to Problem

A rotating electrical machine according to a first aspect of the present invention, comprises: a stator that includes a stator core and a stator coil; a rotor that rotates with respect to the stator; a refrigerant supply port through which a cooling medium is supplied to a coil end protruding from the stator core; and a guide member, disposed along at least a part of the coil end, for causing the cooling medium supplied through the refrigerant supply port to flow along the coil end.

According to a second aspect of the present invention, in the rotating electrical machine according to the first aspect, a rotating shaft of the rotor is placed horizontally; and above a horizontal plane including the rotating shaft, the guide member may be disposed on at least a part of an inner circumference side of the coil end, and below the horizontal plane including the rotating shaft, the guide member may be disposed on at least a part of an outer circumference side of the coil end.

According to a third aspect of the present invention, in the rotating electrical machine according to the first or second aspect, the guide member may be formed of an insulation paper that insulates between the stator core and the stator coil.

According to a fourth aspect of the present invention, in the rotating electrical machine according to the first to third aspects, a guide groove for guiding a flow of the cooling medium in a circumferential direction may be formed on a surface of the guide member.

According to a fifth aspect of the present invention, in the rotating electrical machine according to the first aspect, the stator coil is wound on a tooth of the stator core through a bobbin; a flange extending in a rotation axis direction of the rotor may be formed at an axial end of the bobbin; and an end portion of the flange may be bent in a radial direction of the rotor so as to form the guide member.

According to a sixth aspect of the present invention, in the rotating electrical machine according to the fifth aspect, a rotating shaft of the rotor is placed horizontally; above a horizontal plane including the rotating shaft, the guide member may be formed by bending radially outward the flange that is arranged radially inward of the coil end; and below the horizontal plane including the rotating shaft, the guide member may be formed by bending radially inward the flange that is arranged radially outward of the coil end.

A rotating electrical machine according to a seventh aspect of the present invention, comprises: a stator that includes a stator core and a stator coil; a rotor that rotates with respect to the stator; and a refrigerant supply port through which a cooling medium is supplied to a coil end protruding from the stator core, wherein: a guide groove that guides the cooling medium is formed on an outer circumference surface and/or an inner circumference surface of the coil end.

According to an eighth aspect of the present invention, in the rotating electrical machine according to the seventh aspect, a rotating shaft of the rotor is placed horizontally; and above a horizontal plane including the rotating shaft, the guide groove may be formed on an outer circumference surface of the coil end, and, below the horizontal plane including the rotating shaft, the guide groove may be formed on an inner circumference surface of the coil end.

According to a ninth aspect of the present invention, in the rotating electrical machine according to the seventh or eighth aspect, it is preferable that the guide groove is formed to be recessed on a surface of the coil end.

According to a tenth aspect of the present invention, in the rotating electrical machine according to the seventh or eighth aspect, it is preferable that the guide groove is formed by providing an insulation rib in a protruding manner on a surface of the coil end.

A rotating electrical machine according to an eleventh aspect of the present invention, comprises: a stator that includes a stator core and a stator coil; a rotor that rotates with respect to the stator; and a refrigerant supply port through which a cooling medium is supplied to a coil end protruding from the stator core, wherein: the stator coil is constituted by connecting a plurality of coil segments; at the coil end, an insulation resin film is formed over at least some of gaps between connection end portions that connect end portions of coil segments; and by the connection end portions and the insulation resin film, a guide member is formed for causing a cooling medium supplied through the refrigerant supply port to flow along the coil end.

According to a twelfth aspect of the present invention, in the rotating electrical machine according to the eleventh aspect, a rotating shaft of the rotor is placed horizontally; and the guide member may be formed by forming, above a horizontal plane including the rotating shaft, the insulation resin film on an inner circumference of the connection end portions of the coil segments and by forming, below the horizontal plane including the rotating shaft, the insulation resin film on an outer circumference of the connection end portions of the coil segments.

A rotating electrical machine according to a thirteenth aspect of the present invention, comprises: a stator that includes a stator core and a stator coil; a rotor that rotates with respect to the stator; a refrigerant supply port through which a cooling medium is supplied to the coil end; and a lid-like member that covers at least a part of the coil end and that allows the cooling medium to flow thereinto and to be discharged therefrom.

A rotating electrical machine according to a fourteenth aspect of the present invention, comprises: a stator that includes a stator core and a stator coil; a rotor that rotates with respect to the stator; and a refrigerant supply port through which an oil based cooling medium is supplied to a coil end protruding from the stator core, wherein: an inner circumference surface and/or an outer circumference surface of the coil end are/is applied with a coating material having a higher lipophilicity than that of a coating material applied to a top end face.

Advantageous Effect of the Invention

According to the present invention, a coil end of a stator coil is uniformly cooled, thereby improving cooling performance.

DESCRIPTION OF EMBODIMENTS

First Embodiment

Figure 1:
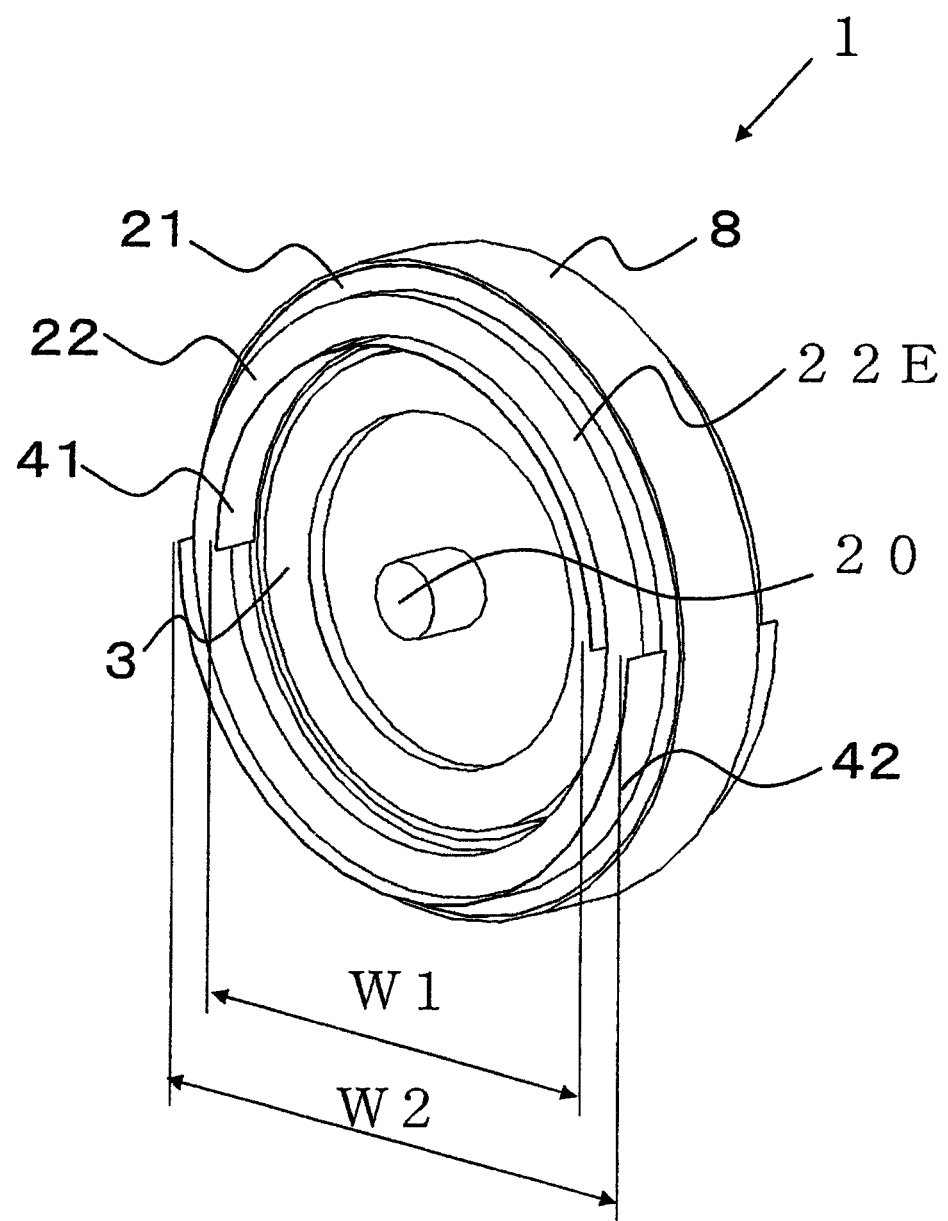
FIG. 1 is a perspective view showing a first embodiment of a rotating electrical machine according to the present invention.
Figure 2:
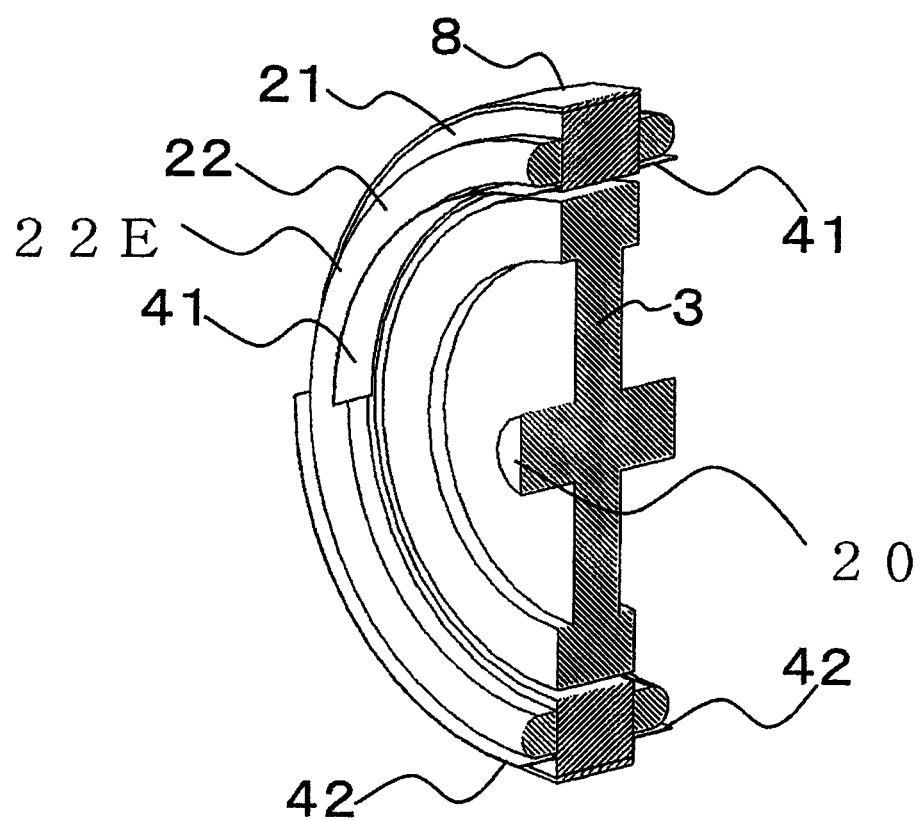
FIG. 2 is a perspective sectional view of the rotating electrical machine of FIG. 1.
Figure 3:
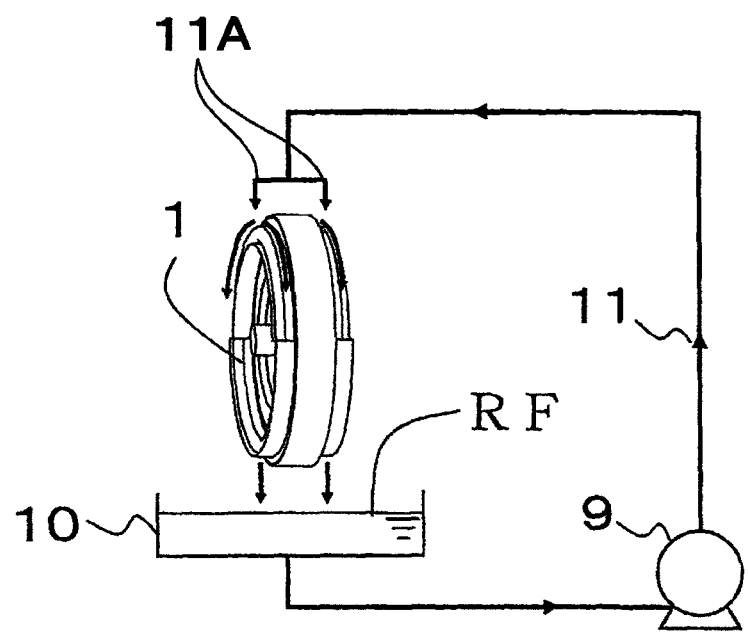
FIG. 3 is a cooling system diagram of the rotating electrical machine of FIG. 1.

The first embodiment of a rotating electrical machine according to the present invention is shown in FIG. 1 to FIG. 3. FIG. 1, FIG. 2, and FIG. 3 are a perspective view, a perspective sectional view, and a cooling system diagram, respectively, that show the first embodiment of the rotating electrical machine.

A rotating electrical machine 1 of the first embodiment includes a housing 8, a stator core 21, a stator coil 22, and a rotor 3 that are housed in the housing 8, and a rotating shaft 20 that is provided in the center of the rotor 3. The stator core 21 and the stator coil 22 constitute a stator. The stator coil 22 is wound on a plurality of slots formed between a plurality of teeth of the stator core 21 that are not illustrated. A coil portion protruding from an axial end of the slot is referred to as a coil end 22E. The stator coil 22 is prepared by winding a coil conductor but illustration of individual coils is curtailed for the sake of convenience.

The both axial ends of the coil end 22E in the stator coil 22 are provided with guide members formed of a sheeted material, i.e., guide plates 41 and 42. More specifically, above the horizontal plane including the rotating shaft 20, the substantially semi-circle guide plate 41 opening downward is provided around the rotating shaft 20 along the upper half portion of the coil end 22E. Below the horizontal plane including the rotating shaft 20, the substantially semi-circle guide plate 42 opening upward is provided around the rotating shaft 20 along the lower half portion of the coil end 22E.

The guide plates 41 and 42, formed of a thin plate, protrude from both end faces of the stator core 21 substantially horizontally in parallel with the rotating shaft 20 of the rotating electrical machine 1. The protrusion length of the guide plates 41 and 42 is longer than the protrusion length of the coil end 22E from the end face of the stator core 21. The guide plate 41 on the upper side is provided along an inner circumference of the stator coil 22 and has a width W1 that is substantially equal to the inner circumference diameter of the stator coil 22. The guide plate 42 on the lower side is provided along an outer circumference of the stator coil 22 and has a width W2 that is substantially equal to the outer circumference diameter of the stator coil 22. The width W1 is less than the width W2.

FIG. 3 shows the cooling system of the rotating electrical machine 1. A cooling medium RF is fed to a cooling medium supply line 11 through a pump 9. The cooling medium supply line 11 is routed up to above the coil end 22E. The cooling medium RF is spouted from above towards the upper portion of the coil end 22E through refrigerant supply ports 11A, which are refrigerant outlet ports of the cooling medium supply line 11. After spouted, the cooling medium RF moves down the coil end 22E of the stator coil 22 by its spout pressure and gravity and then drips down on an oil pan 10 provided below the rotating electrical machine 1. After dripping down on the oil pan 10, the cooling medium RF is fed again to the cooling medium supply line 11 through the pump 9.

After spouted from the cooling medium supply line 11, the cooling medium RF flows down on the outer circumference side of the coil end 22E from the upper portion of the coil end 22E and hence cools the coil end 22E. In addition, the cooling medium RF flows along the outer circumference surface of the guide plate 41 on the upper side, then flows into the inner circumference surface of the guide plate 42 on the lower side, and after that, flows along the inner circumference surface of the guide plate 42 to the lower end of the coil end 22E. Since the cooling medium RF flows through the guide plates 41 and 42 while contacting the coil end 22E, the coil end 22E can be further cooled.

The following operations and advantageous effects can be achieved according to the rotating electrical machine of the first embodiment as above.

(1) The cooling medium RF flows along the coil end 22E through the guide plates 41 and 42. In other words, the cooling medium RF flows down to the lower end of the coil end 22E without being removed from the guide plates 41 and 42. As a result, temperature at the stator coil 22 will not rise locally, thereby improving cooling performance of the rotating electrical machine.

(2) The flow of the cooling medium RF along the guide plates 41 and 42 is significantly slower than a traditional, vertical flow along the coil end 22E and hence the cooling medium RF contacts the stator coil 22 for a relatively long period of time. In other words, the guide plates 41 and 42 guide and hold the cooling medium RF and thus can increase cooling efficiency of the stator coil 22, thereby reducing rise in the maximum temperature of the rotating electrical machine.

(3) Since the width W1 of the guide plate 41 on the upper side is less than the width W2 of the guide plate 42 on the lower side, most of the cooling medium RF collected at the guide plate 41 can flow into the guide plate 42, thereby cooling the stator coil 22 efficiently.

(4) Even though cooling performance is improved by increasing a power requirement for cooling such as increasing an amount of cooling medium spout, it does not meet the current situation in which reduction in energy consumption is an important issue. However, according to the rotating electrical machine of the first embodiment, the rotating electrical machine can be effectively cooled without wasting energy.

(5) Even though the cooling effect can be increased by sealing the periphery of the coil end with a case and soaking the coil end into the cooling medium, the rotating electrical machine is increased in size and weight. According to the rotating electrical machine of the first embodiment, however, the periphery of the coil end will not be sealed with a case, thereby not inhibiting reduction in the size of the rotating electrical machine.

The rotating electrical machine of the first embodiment may be varied as follows.

(1) While in FIG. 1 to FIG. 3, both of the guide plates 41 and 42 for the cooling medium are provided, any one of them may be provided.

(2) While the guide plates 41 and 42 are provided at the both axial ends of the coil end 22E, they may be provided only at any one of the ends.

(3) While in FIG. 3, the cooling medium is pumped by the pump 9, a structure in which the cooling medium drips down by gravity from the upper portion of the rotating electrical machine 1 may be adopted.

Second Embodiment

Figure 4:
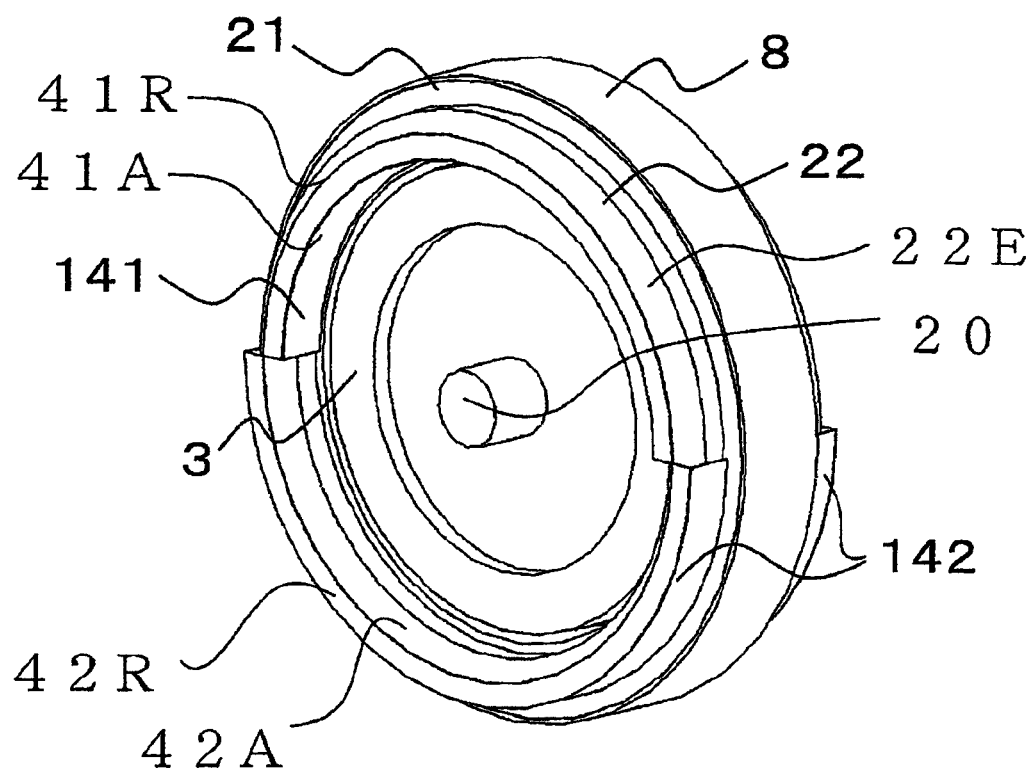
FIG. 4 is a perspective view showing a second embodiment of the rotating electrical machine according to the present invention.
Figure 5:
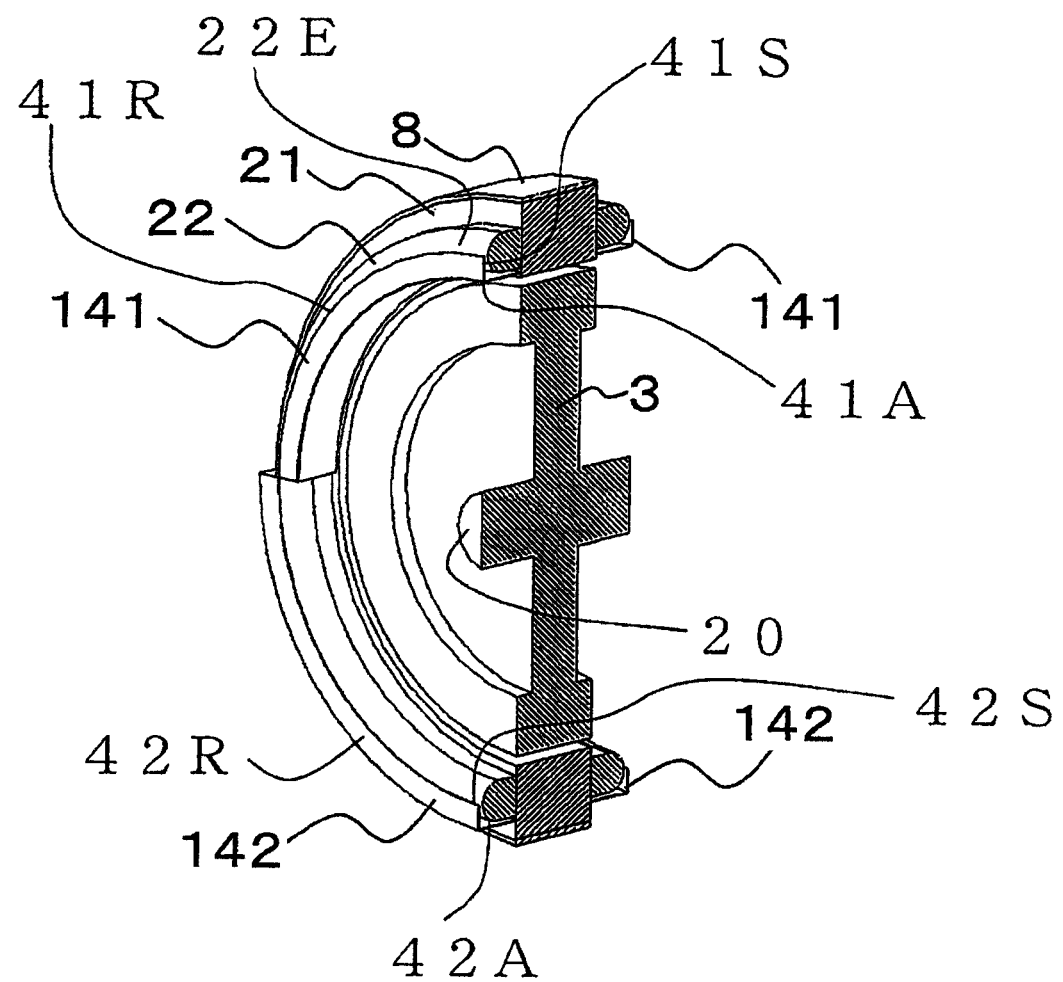
FIG. 5 is a perspective sectional view of the rotating electrical machine of FIG. 4.

The second embodiment of the rotating electrical machine according to the present invention is shown in FIG. 4 and FIG. 5. FIG. 4 and FIG. 5 are a perspective view and a perspective sectional view, respectively, showing the second embodiment. It is to be noted that in the figures, parts that are identical or corresponding to those in the first embodiment are designated by the same reference numerals, and their description will be curtailed.

In the second embodiment, the guide plates 41 and 42 in the first embodiment are changed in shape. More specifically, the guide plates 41 and 42 in the first embodiment are a single thin plate protruding in the axial direction of the rotating shaft 20. In the second embodiment, L-shaped guide plates 141 and 142 are provided corresponding to the guide plates 41 and 42 in the first embodiment.

The L-shaped guide plate 141 is formed to have an L-shaped cross section by combining a thin plate 41A having a certain length in the rotation axis direction and a thin plate 41R having a certain length from its front end radially outwards the stator coil 22. The L-shaped guide plate 142 is formed to have an L-shaped cross section by combining a thin plate 42A having a certain length in the rotation axis direction and a thin plate 42R having a certain length from its front end radially inwards the stator coil 22.

After spouted from above the rotating electrical machine, the cooling medium RF flows along the coil end 22E as well as flows along the L-shaped flow guide plate 141 and the L-shaped guide plate 142. In other words, the cooling medium RF flows through a space 41S formed by the L-shaped guide plate 141 and the coil end 22E. The space 41S is a flow path having a substantially rectangular cross section opening in the outer circumference direction of the rotating electrical machine. In addition, the cooling medium RF flows through a space 42S formed by the L-shaped guide plate 142 and the coil end 22E. The space 42S is a flow path having a substantially rectangular cross section opening in the inner circumference direction.

According to the rotating electrical machine of the second embodiment as above, the following operations and advantageous effects can further be achieved at the same time the operations and advantageous effects similar to those in the first embodiment can be achieved.

(1) Since the spaces 41S and 42S are covered at the both axial ends, the cooling medium RF flows in the circumferential direction while dipping the coil end 22E in the cooling medium without being removed halfway towards the side. As a result, cooling efficiency can be increased more than that in the first embodiment is, and thus the cooling performance of the stator coil 22 is not decreased locally, thereby reducing rise in the maximum temperature of the rotating electrical machine.

It is to be noted that, similarly to the first embodiment, at least one of the L-shaped guide plates 141 and 142 may be provided, or the guide plates 141 and 142 may be provided only at one axial end of the coil end 22E. It may be arranged that the cooling medium RF is pumped by the pump 9 or caused to drip down by gravity.

Third Embodiment

The third embodiment of the rotating electrical machine according to the present invention will be explained with reference to FIG. 6 and FIG. 7.

Figure 6:
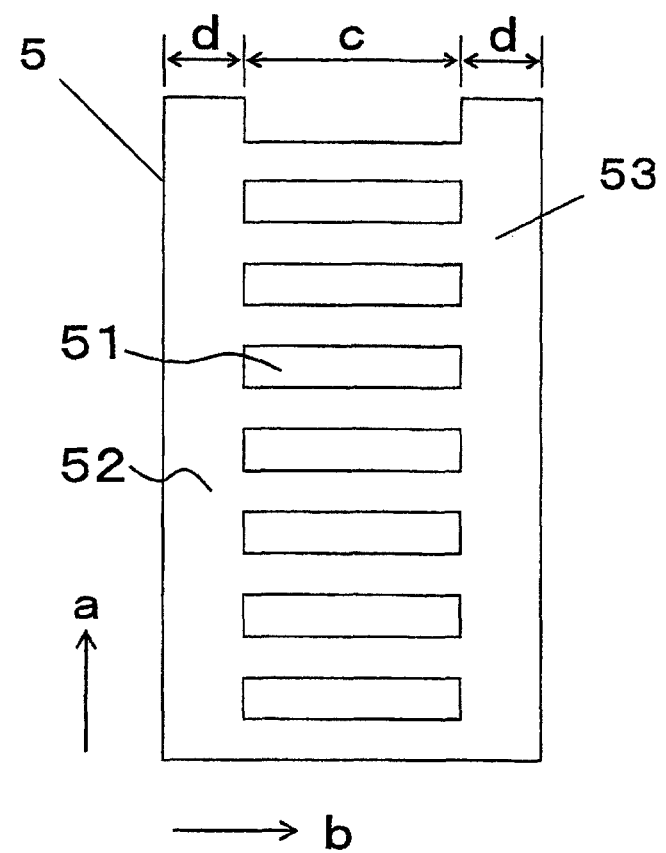
FIG. 6 is a front view showing an insulation paper used for a third embodiment of the rotating electrical machine according to the present invention.
Figure 7:
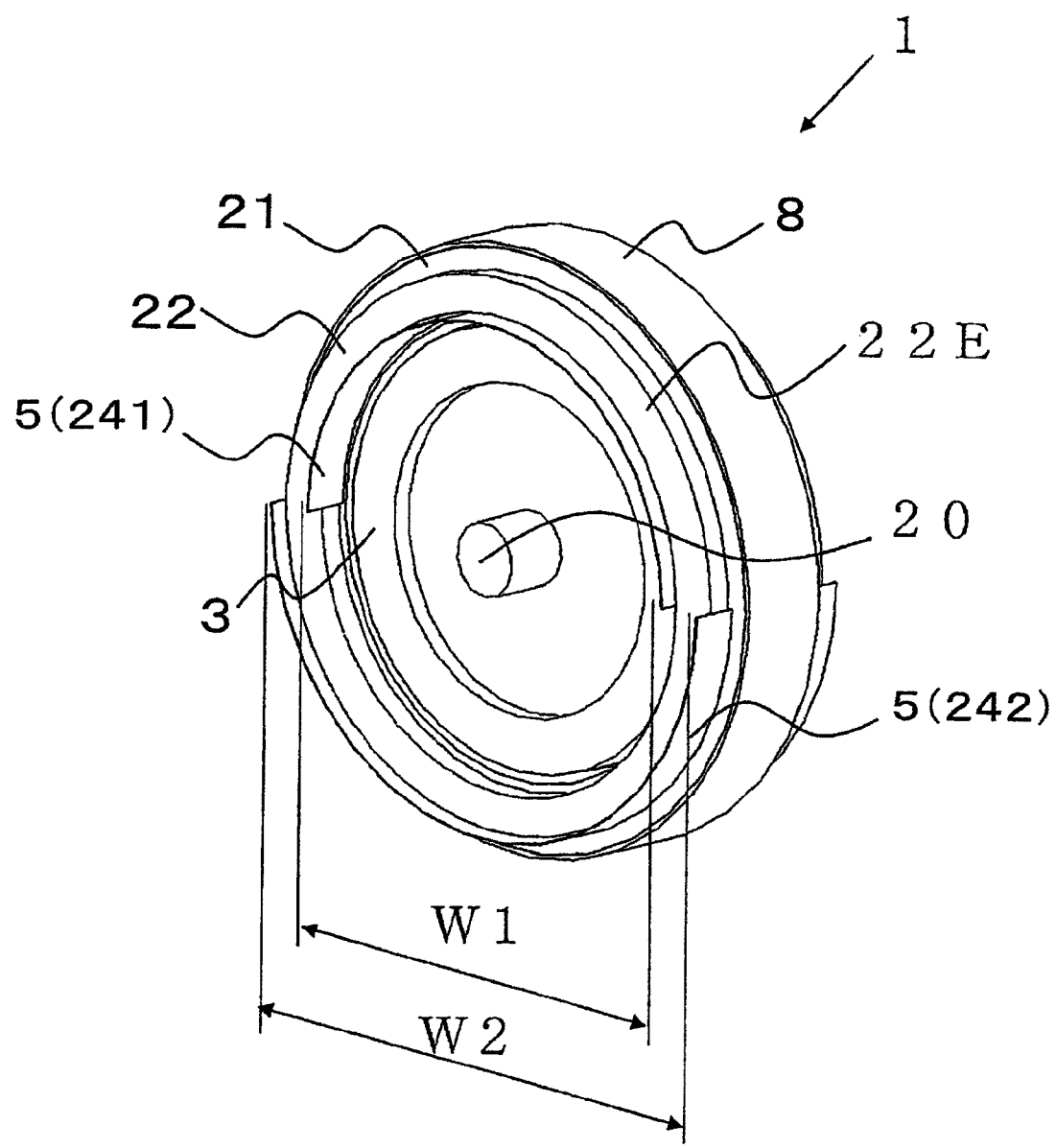
FIG. 7 is a perspective view showing the rotating electrical machine in which a guide plate is formed of the insulation paper of FIG. 6.

FIG. 6 is a front view showing an insulation paper 5 for ensuring electrical insulation between the stator core 21 and the stator coil 22 and FIG. 7 is a perspective view showing the rotating electrical machine 1 in which guide plates 241 and 242 are formed of the insulation paper 5. In FIG. 6, a direction "a" corresponds to the circumferential direction of the stator and a direction "b" corresponds to the direction of the rotating shaft. In addition, a dimension "c" corresponds to a thickness "s" of the stator core 21. It is to be noted that in the figures, parts that are identical or corresponding to those in the first embodiment are designated by the same reference numerals, and their description will be curtailed.

In the third embodiment, the insulation paper 5 is attached to the inner and outer circumferences of the stator coil 22 so as to form the guide plates 241 and 242. In other words, as shown in FIG. 7, each of the guide plates 241 and 242 provided at the coil end 22E of the rotating electrical machine 1 is formed of the insulation paper 5 shown in FIG. 6.

As shown in FIG. 6, in the center of the rectangular-shaped insulation paper 5, a plurality of lateral rectangular hole sections 51 are equally spaced in parallel in the longitudinal direction. The portion between the adjacent hole sections 51 is a slot engagement portion 52. The both exterior sides of the hole sections 51 is provided with a flared portion 53 that constitutes the guide plates 241 and 242. The width c of the hole sections 51 and the slot engagement portion 52 corresponds to an axial length of the teeth and the slots that are not illustrated, and a width d of the flared portion 53 corresponds to a protrusion length of the guide plates 241 and 242 from the stator coil end 22E.

The teeth of the stator core 21 are inserted into the hole sections 51, and the slot engagement portions 52 are engaged into the slots of the stator core 21. More specifically, in the lower half portion of the rotating electrical machine 1, the insulation paper 5 is attached to the outermost diameter (slot bottom portion) of the slots of the stator core 21 so as to form the guide plate 241 and, in the upper half portion thereof, the insulation paper 5 is attached to the innermost diameter (slot open side) of the slots of the stator core 21 so as to form the guide plate 242.

According to the rotating electrical machine of the third embodiment as above, the following operations and advantageous effects can further be achieved at the same time the operations and advantageous effects similar to those in the first embodiment can be achieved.

(1) The insulation paper 5 functions as an insulation material that insulates between the stator core 21 and the stator coil 22 and also functions as the guide plates 241 and 242. As a result, it is not necessary to prepare a separate member as the guide plates 241 and 242, thereby achieving an advantageous effect of allowing the guide plates 241 and 242 of the cooling medium RF to be formed without increasing the number of components.

The rotating electrical machine of the third embodiment may be varied as follows.

(1) The insulation paper 5 does not necessarily have to be an insulation paper. As long as a desired electrical insulation performance can be ensured, a resin plate or the like may be adopted.

(2) After the insulation paper 5 is provided at the slots of the stator core 21 and the stator coil 22 is wound through the slots, a side end portion of a predetermined length at the flared portion 53 may be bent towards the inner diameter side or the outer diameter side of the stator core 21 so as to form the guide plates 241 and 242 into the same shape as those in the second embodiment. This achieves the same advantageous effect as that of the second embodiment.

Figure 17:
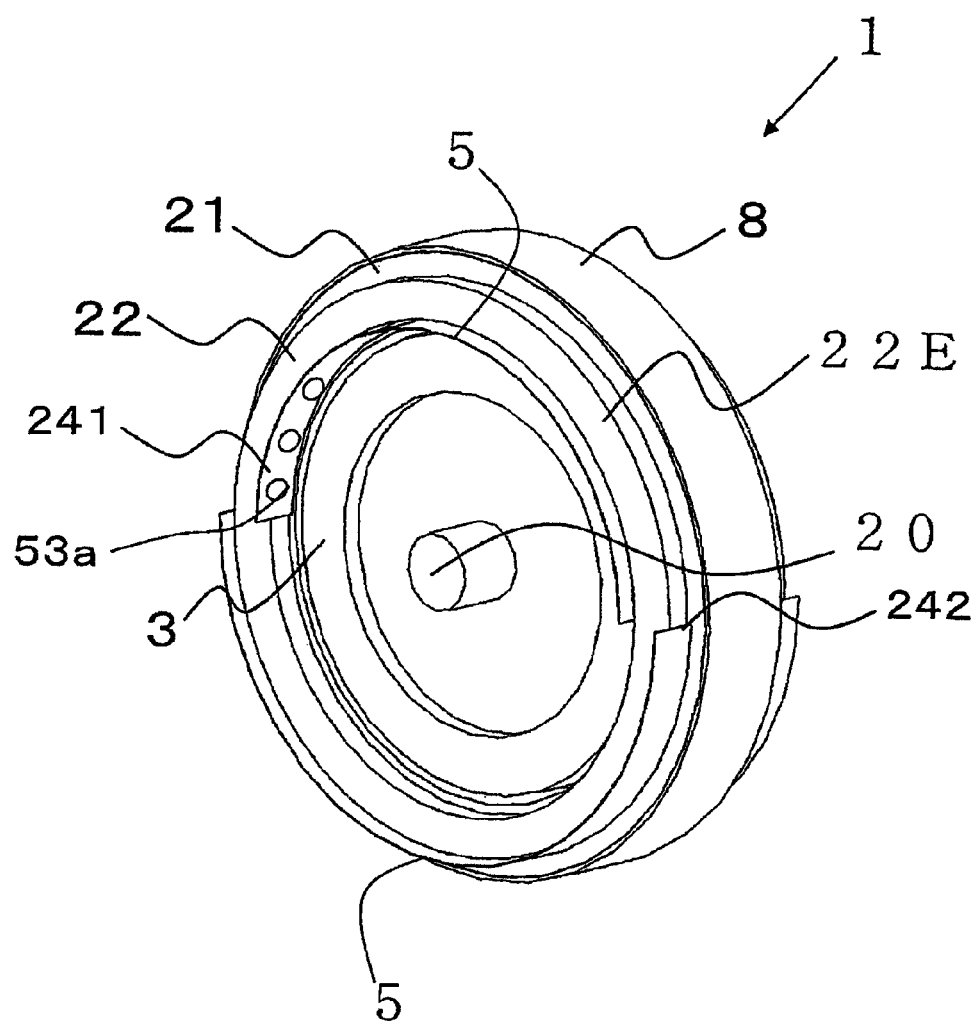
FIG. 17 is a perspective view showing a variation of the third embodiment of the rotating electrical machine according to the present invention.

(3) As shown in FIG. 17, holes 53a may be provided on the insulation paper 5 that forms the guide plate 241 so that the cooling medium RF flows smoothly, thereby increasing the cooling effect.

Figure 18:
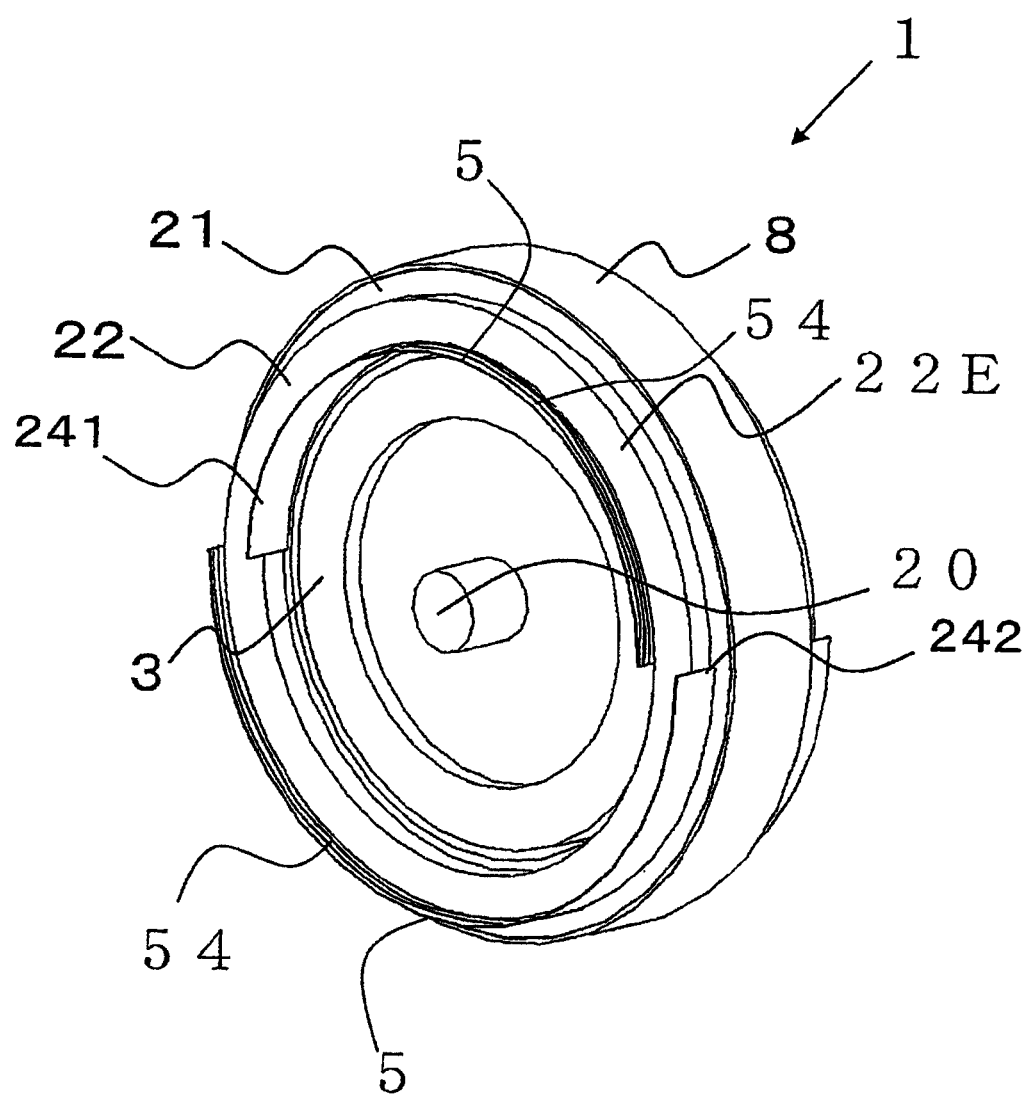
FIG. 18 is a perspective view showing a variation of the third embodiment of the rotating electrical machine according to the present invention.

(4) As shown in FIG. 18, a rib 54 that circumferentially extends may be provided on the flared portion 53 of the insulation paper 5 that forms the guide plates 241 and 242 of the third embodiment. The cooling medium RF is held and guided on the guide plates 241 and 242 so that it flows smoothly, thereby increasing the cooling effect. It is to be noted that the rib 54 may be formed with a certain angle with respect to the circumference.

Fourth Embodiment

The fourth embodiment of the rotating electrical machine according to the present invention will be explained with reference to FIG. 8 and FIG. 9.

Figure 8:
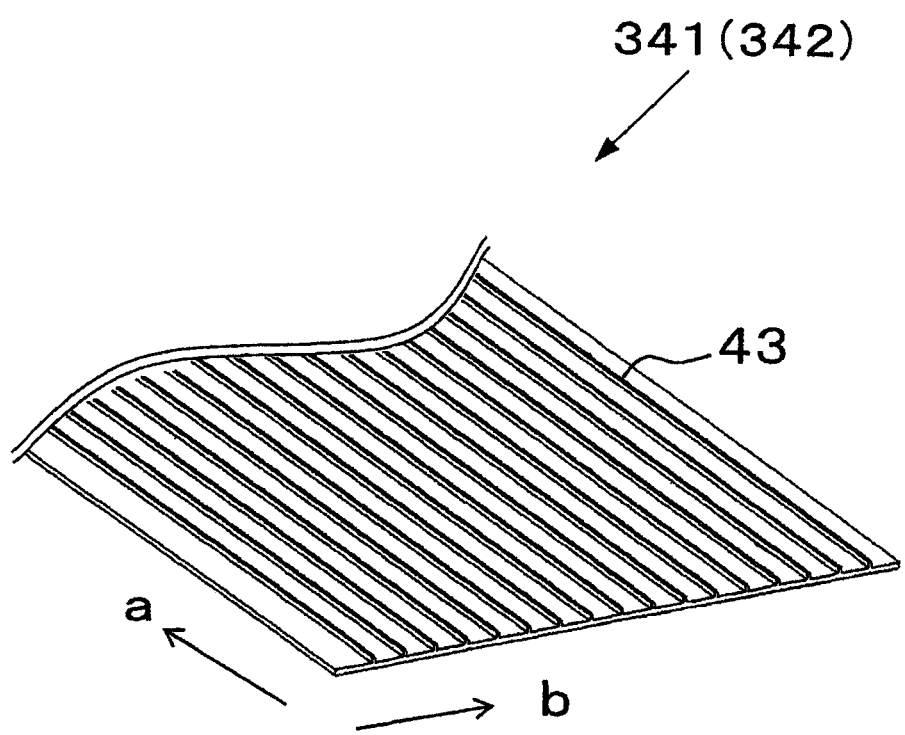
FIG. 8 is a partial perspective view of a cooling medium guide plate used for a fourth embodiment of the rotating electrical machine according to the present invention.
Figure 9:
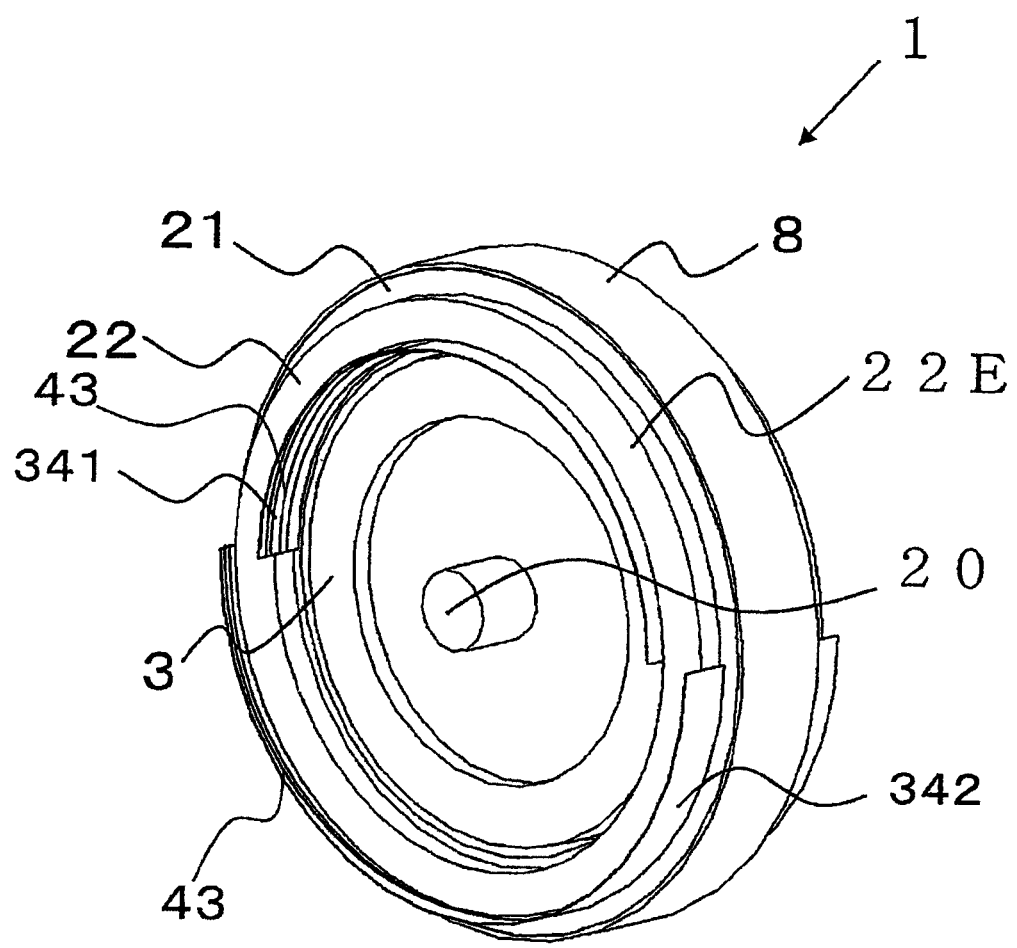
FIG. 9 is a perspective view showing the rotating electrical machine to which the guide plate of FIG. 8 is applied.

FIG. 8 is a perspective view showing the surface of a guide plate 341 (342) in detail, and FIG. 9 is a perspective view showing the rotating electrical machine 1 to which the guide plates 341 and 342 are applied. In FIG. 8, the direction "a" corresponds to the circumferential direction of the stator and the direction "b" corresponds to the axial direction of the rotating shaft 20. It is to be noted that in the figures, parts that are identical or corresponding to those in the first embodiment are designated by the same reference numerals, and their description will be curtailed.

On the surface of the guide plate 341 (342), a plurality of ribs 43 that circumferentially extend are formed in parallel with a circumferential direction. The guide plate 341 may be provided with the ribs 43 on the outer circumference surface and the guide plate 342 may be provided with the ribs 43 on the inner circumference surface. However, when a common component is used for the guide plates 341 and 342, the ribs 43 are to be provided on the both faces of the guide plates 341 and 342 as illustrated.

According to the rotating electrical machine of the fourth embodiment as above, the following operations and advantageous effects can further be achieved at the same time the operations and advantageous effects similar to those in the first embodiment can be achieved.

(1) The cooling medium RF is guided by the ribs 43 so as to smoothly flow along the circumference. This allows the refrigerant to be guided to the both circumferential end portions of the guide plate 341 and then to the lowest portion of the guide plate 342 without providing the thin plates 41R and 42R having a function to prevent the refrigerant from being removed axially as in the second embodiment. This can improve the cooling performance.

(2) An L-shaped flow path formed by bending the axial top end portions of the guide plates 341 and 342 in a similar manner to the second embodiment facilitates control of the flow of the cooling medium RF, compared to the L-shaped flow path on a smooth surface, thereby achieving an advantageous effect of improving the cooling performance.

(3) In other words, in the fourth embodiment, in addition to the advantageous effects of the first and the second embodiments, an advantageous effect of improving the cooling performance can be achieved by making it easier to control the flow of the cooling medium RF.

The rotating electrical machine of the fourth embodiment may be varied as follows.

Figure 10:
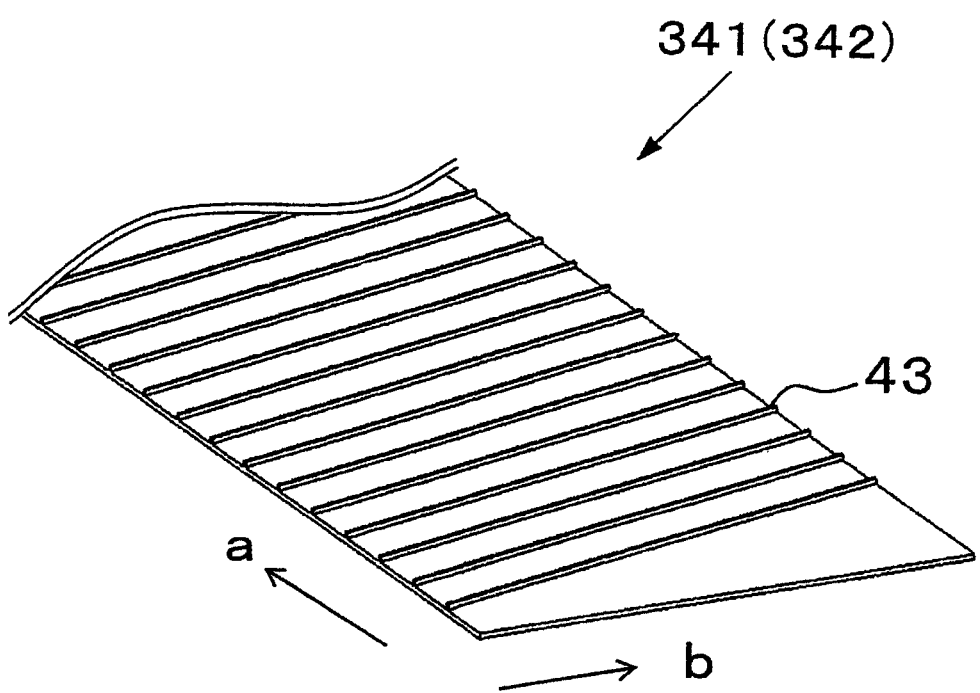
FIG. 10 is a partial perspective view showing a variation of the guide plate of FIG. 8.

(1) While in FIG. 8, the ribs 43 are provided in parallel with the circumference (in the direction a) of the stator coil 22, the ribs 43 may be provided, as shown in FIG. 10, in a direction having a certain angle with the direction a.

Fifth Embodiment

The fifth embodiment of the rotating electrical machine according to the present invention will be explained with reference to FIG. 11 and FIG. 12.

Figure 11:
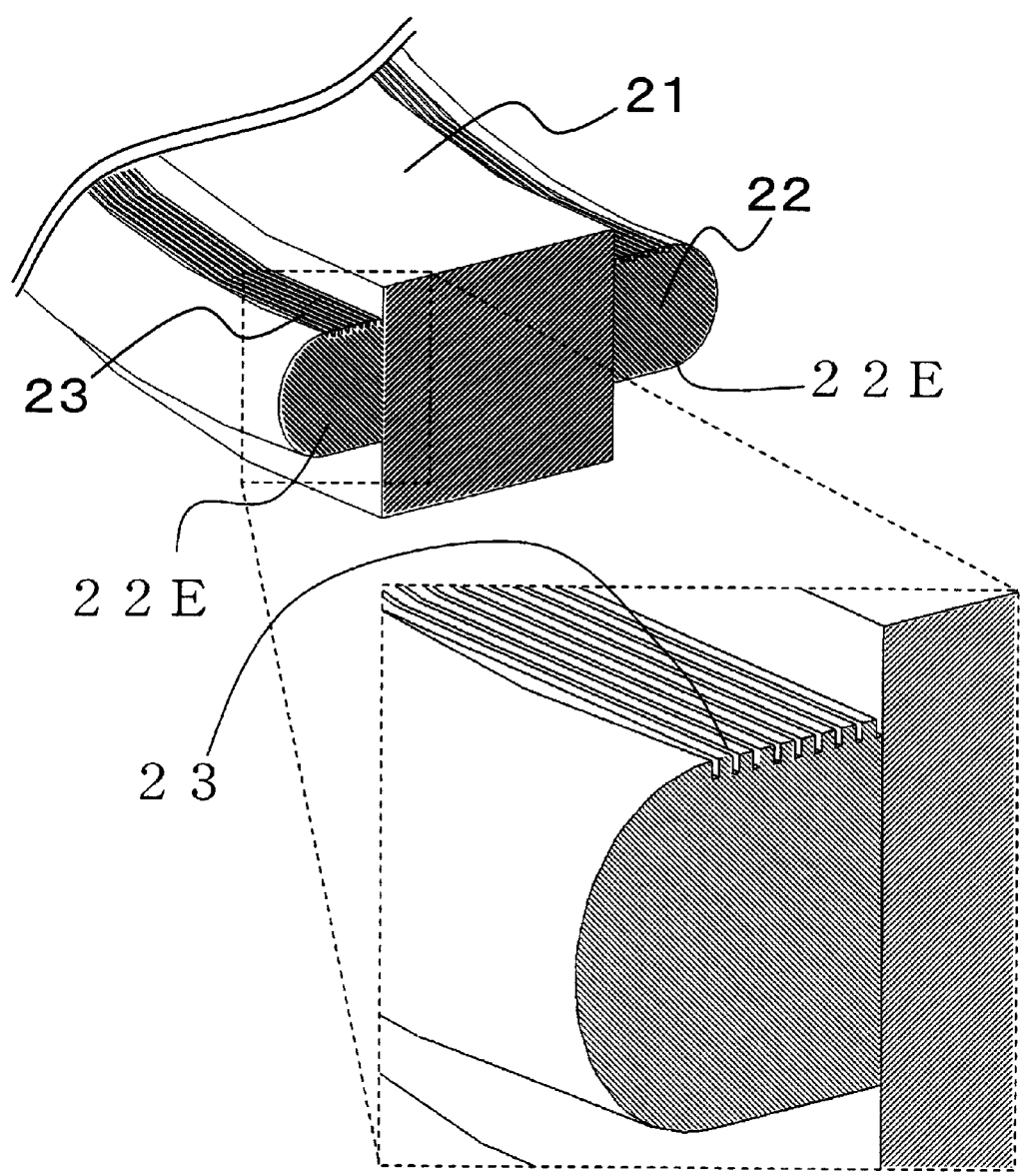
FIG. 11 is a partial perspective sectional view of the stator in a fifth embodiment of the rotating electrical machine according to the present invention.
Figure 12:
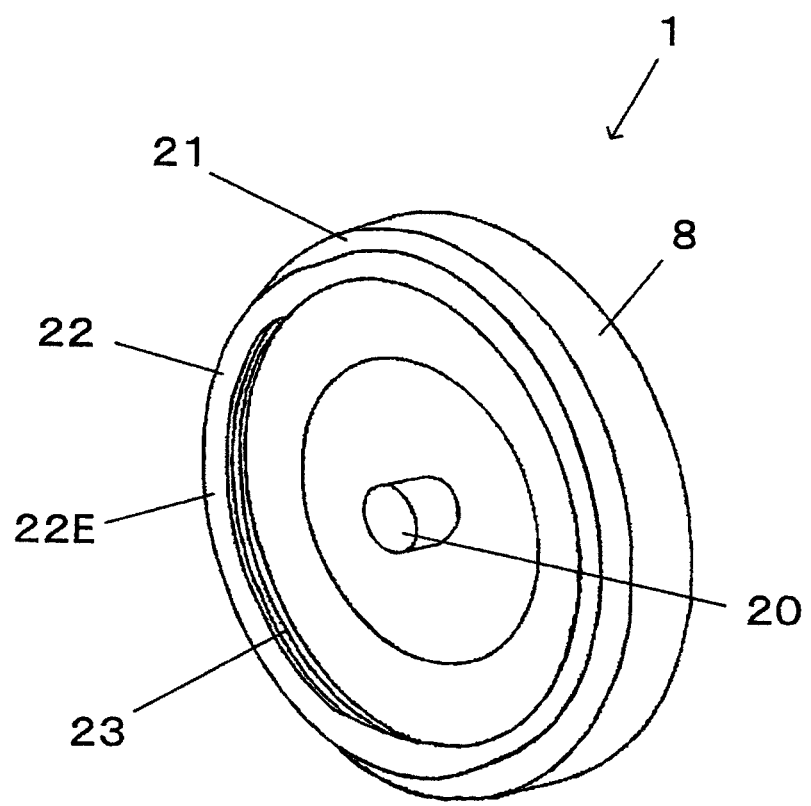
FIG. 12 is a perspective view showing the rotating electrical machine including the stator coil of FIG. 11.

FIG. 11 shows a part of a perspective cross section of the stator of the rotating electrical machine according to the fifth embodiment, and FIG. 12 shows a perspective view of the same rotating electrical machine.

In the fifth embodiment, the above-described guide plate is not provided, and the coil end 22E of the stator coil 22 itself is provided with a function to hold and guide the cooling medium RF.

As shown in FIG. 11 and FIG. 12, guide grooves 23 that extend circumferentially are formed (recessed) on the inner circumference surface of the coil end 22E. Since as described earlier, the stator coil 22 is configured by winding the coil conductor on the slots, the guide grooves 23 are provided on the surface of the coil conductor. The guide groove 23 can be formed by, for instance, pressing a jig against the surface of the coil conductor so as to form an indentation.

The following operations and advantageous effects can be achieved according to the rotating electrical machine of the fifth embodiment as above.

(1) After spouted towards the stator coil 22 and reached the inner circumference of the coil end 22E, the cooling medium RF flows along the inner circumference of the coil end 22E while being guided by the guide grooves 23. Such configuration causes the cooling medium RF to contact the inner circumference of the coil end 22E for a long period of time without being removed from the coil end 22E, thereby achieving an advantageous effect of improving the cooling performance.

(2) The stator coil 22 itself is provided with a function to hold and guide the cooling medium RF, so that the guide plates 41 and 42 are unnecessary and the number of components is reduced, thereby resulting in reduction of production cost.

The rotating electrical machine of the fifth embodiment may be varied as follows.

(1) While in FIG. 11 and FIG. 12, the guide grooves 23 are formed on the inner circumference surface of the stator coil end 22, the guide grooves 23 may be formed on the outer circumference of the stator coil end 22 or on both of the inner and outer circumferences.

(2) While in FIG. 11 and FIG. 12, the guide grooves 23 are formed to extend in a circumferential direction, it may be formed to have a certain angle with respect to the circumferential direction.

Sixth Embodiment

The sixth embodiment of the rotating electrical machine according to the present invention will be explained with reference to FIG. 13 and FIG. 14.

Figure 13:
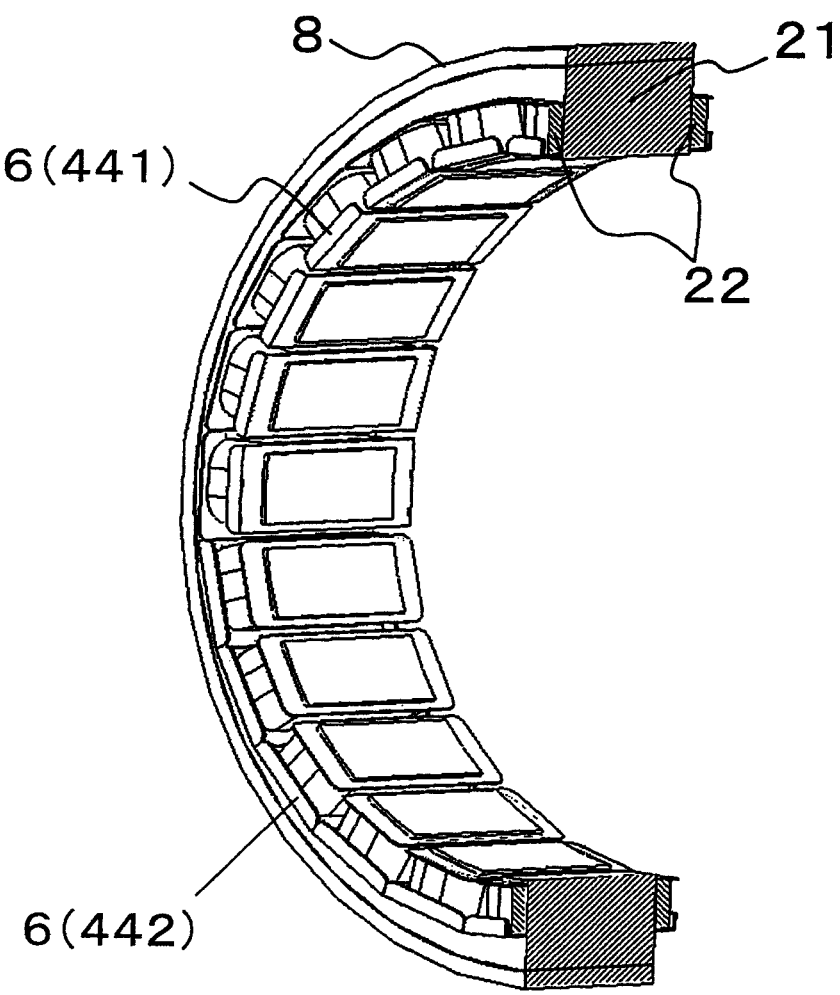
FIG. 13 is a perspective sectional view of the stator in a sixth embodiment of the rotating electrical machine according to the present invention.
Figure 14:
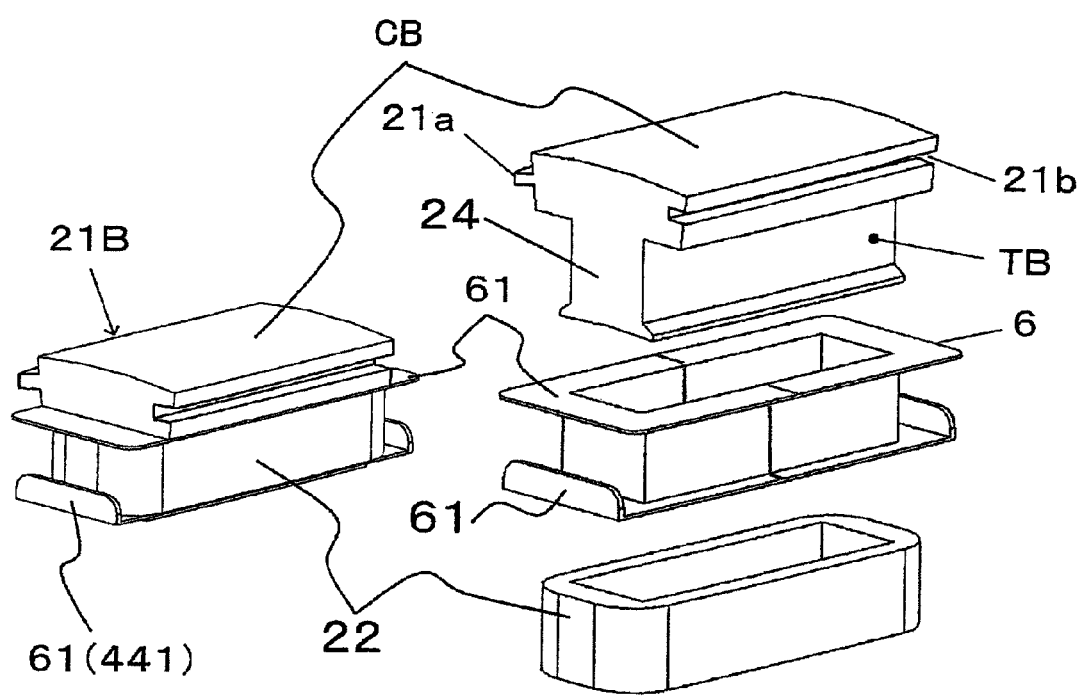
FIG. 14 is a partial perspective view and an exploded view of the stator of FIG. 13.

FIG. 13 is a perspective sectional view of the stator in the sixth embodiment of the rotating electrical machine according to the present invention, and FIG. 14 is a partial perspective view and an exploded view of the stator of FIG. 13. It is to be noted that in the figures, parts that are identical or corresponding to those in the first embodiment are designated by the same reference numerals, and their description will be curtailed.

The rotating electrical machine according to the present embodiment intends a rotating electrical machine that uses a split stator core constituted by coupling a plurality of core blocks in a circumferential direction and adopts a stator winding method of concentrated winding, and uses as a guide plate a part of bobbin on which the stator coil is wound.

As shown in FIG. 13, the stator core 21 of the rotating electrical machine 1 is constituted by coupling a plurality of stator core blocks 21B shown in FIG. 14 in a circumferential direction. The stator core block 21B is constituted with a core portion CB and a tooth portion TB, and the stator coil 22 is wound on the tooth portion TB through a bobbin 6. The bobbin 6 is divided into two parts, and each part of the bobbin 6 is attached from either end of the rotation axis direction of a tooth portion 24. The coil conductor is wound for a predetermined number of turns on the bobbin 6 attached to the tooth portion 24 and thus the stator coil 22 is constituted. It is to be noted that a protrusion 21a and a recess 21b are provided at the both end faces in a circumferential direction of the core portion CB.

Both ends of the bobbin 6 (in the vertical direction of FIG. 14) are formed with a pair of upper and lower flanges 61 that extends in the axial direction of the stator coil 22. For the bobbins 6 above the horizontal plane including the rotating shaft 20, one of the flanges 61, i.e., the flange 61 of the tooth top end side, is bent in an outer diameter direction of the rotating electrical machine to form a guide plate 441 having an L-shaped cross section, similarly to the second embodiment. For the bobbins 6 below the horizontal plane including the rotating shaft 20, the front end portion of the flange 61 on the tooth base side is bent in an inner diameter direction of the rotating electrical machine to form a guide plate 442 having an L-shaped cross section, similarly to the second embodiment.

While a coil conductor is to be wound on the bobbin 6, it is difficult to wind the stator coil 22 on the bobbin 6 in a state where the flange 61 is bent. Therefore, after the stator coil 22 is wound, the top end portion of the flange 61 of the bobbin 6 is bent. It is to be noted that both end portions of the coil conductor are drawn from each core block 21B, and end portions of adjacent same-phase coil wires are connected with each other by a connection coil.

As shown in FIG. 13, above the horizontal plane including the rotating shaft 20, the flanges 61 whose front ends are bent in the outer diameter direction of the rotating electrical machine are arranged on the inner circumference side of the stator coil 22. Below the horizontal plane including the rotating shaft 20, on the other hand, the flanges 61 whose front ends are bent in the inner diameter direction of the rotating electrical machine are arranged on the outer circumference side of the stator coil 22 and bent radially inwards.

According to the rotating electrical machine of the sixth embodiment, the operations and advantageous effects similar to those in the first and the second embodiments can be achieved. In addition, improvement in the bobbin 6, which is an existing component, allows the guide plates 441 and 442 to be formed without increasing the number of components and without increasing production cost.

The rotating electrical machine of the sixth embodiment may be varied as follows.

(1) Only the flange 61 of inner circumference side may be bent towards the outer diameter side or only the flange 61 of the outer circumference side may be bent towards the inner diameter side.

(2) All the flanges 61 in a given area do not need to be bent, and a variety of combinations are possible such as bending flanges at intervals and leaving some flanges without bending them.

Seventh Embodiment

The seventh embodiment according to the present invention will be explained with reference to FIG. 15.

Figure 15:
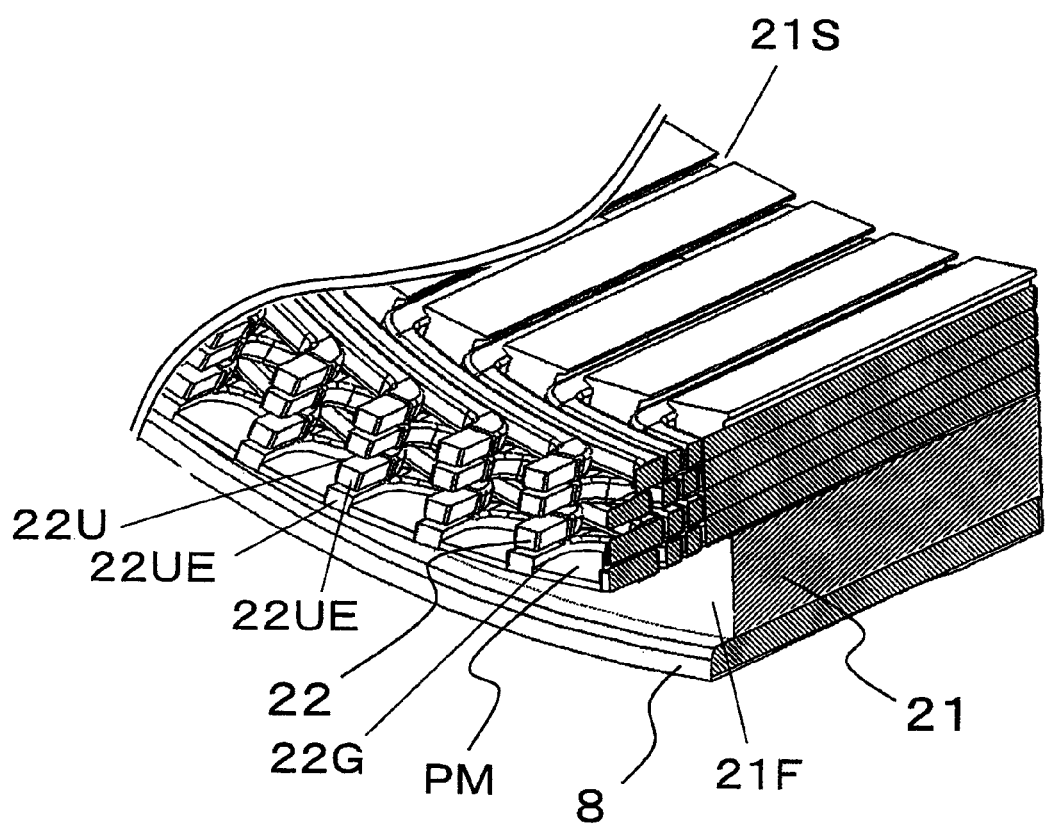
FIG. 15 is a partial perspective sectional view of the stator in a seventh embodiment of the rotating electrical machine according to the present invention.

FIG. 15 is a partial perspective sectional view of the stator in the seventh embodiment of the rotating electrical machine according to the present invention. It is to be noted that in the figure, parts that are identical or corresponding to those in the first embodiment are designated by the same reference numerals, and their description will be curtailed.

The present embodiment is directed to a rotating electrical machine whose winding method of the stator is a distributed winding. A resin film is formed by filling an insulation resin into a gap between segment coil end portions which are circumferentially adjacent so that the guide plates 441 and 442 are formed by the continuity in the segment coil end portions and the resin film.

The stator core 21 is provided with slots 21S in an axial direction and a coil segment 22U is inserted into each of the slots 21S. End portions 22UE of the coil segments 22U inserted into the adjacent same-phase slots 21S protrude from an axial end face 21F of the stator core 21 and are connected with each other at the coil end portion.

In a gap 22G between the end portions 22UE of the circumferentially adjacent coil segments 22U, a resin film PM constituted with insulation resin such as varnish is formed. The resin film PM and the end portions 22UE are integrated to be continuous so as to form a guide member for a cooling medium similar to the guide plates 41 and 42 of the first embodiment.

For forming the resin film PM, a method is adopted, for example, in which in a state where the gap 22G is covered on the lower side by a jig, varnish or the like is supplied, and then the jig is removed after the varnish or the like is cured.

According to the rotating electrical machine of the seventh embodiment, the operations and advantageous effects similar to those in the first embodiment can be achieved. In addition, an extra member is unnecessary although there is an extra process of forming the resin film PM with varnish. This allows a cooling medium guide member having an equal function to that of the guide plates 41 and 42 to be formed without increasing the number of components and without increasing production cost.

While in FIG. 15, the resin film PM is formed on the outmost diameter side of the adjacent coil segments 22U, the resin film PM may be formed on the innermost diameter side. In addition, the formation position of the resin film PM may be changed depending upon a circumferential position, for example, in the upper half and the lower half of the rotating electrical machine.

Eighth Embodiment

The eighth embodiment of the rotating electrical machine according to the present invention will be explained with reference to FIG. 16.

Figure 16:
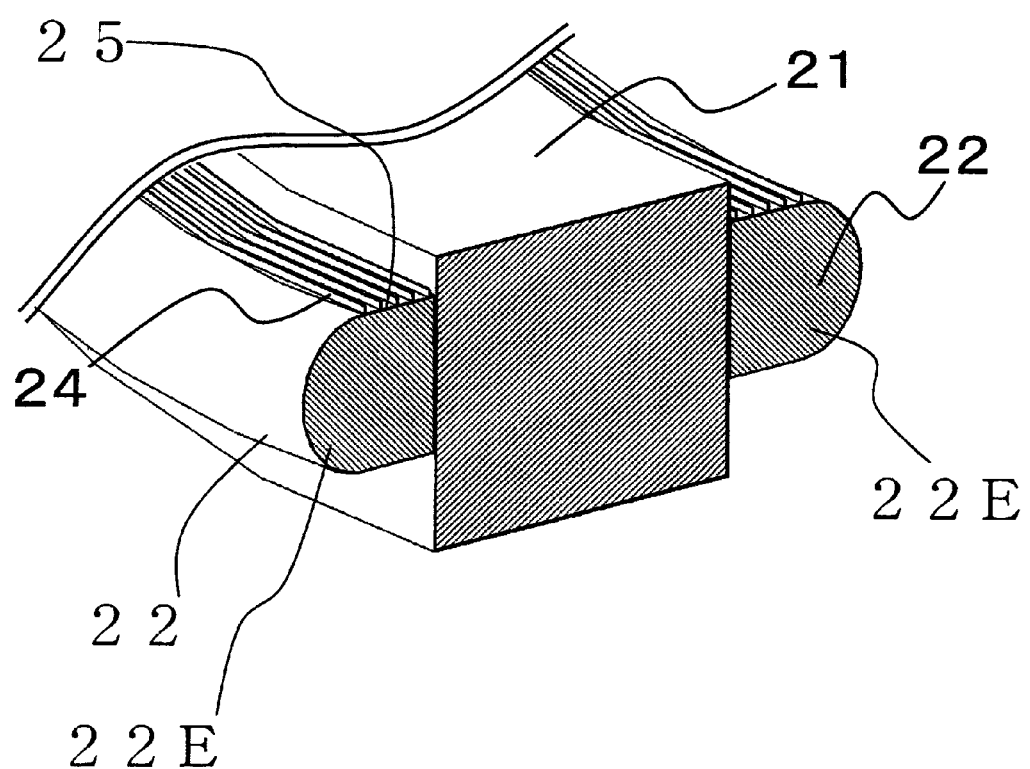
FIG. 16 is a partial perspective sectional view of the stator in an eighth embodiment of the rotating electrical machine according to the present invention.

FIG. 16 is a partial perspective sectional view of the stator in the eighth embodiment of the rotating electrical machine according to the present invention. It is to be noted that in the figure, parts that are identical or corresponding to those in the fifth embodiment are designated by the same reference numerals, and their description will be curtailed.

In rotating electrical machine according to the present embodiment, insulation ribs 25 are provided in a protruding manner on the inner circumference surface of the coil end 22E in place of the guide grooves 23 of the fifth embodiment. For forming the rib 25, a method is used, for example, in which a resin mold is closely attached to the inner circumference surface of the coil end 22E, and then an insulation resin is poured into the mold to be cured.

According to the rotating electrical machine according to the present embodiment, the operations and advantageous effects similar to those in the fifth embodiment can be achieved.

Ninth Embodiment

The ninth embodiment of the rotating electrical machine according to the present invention will be explained with reference to FIG. 19.

Figure 19:
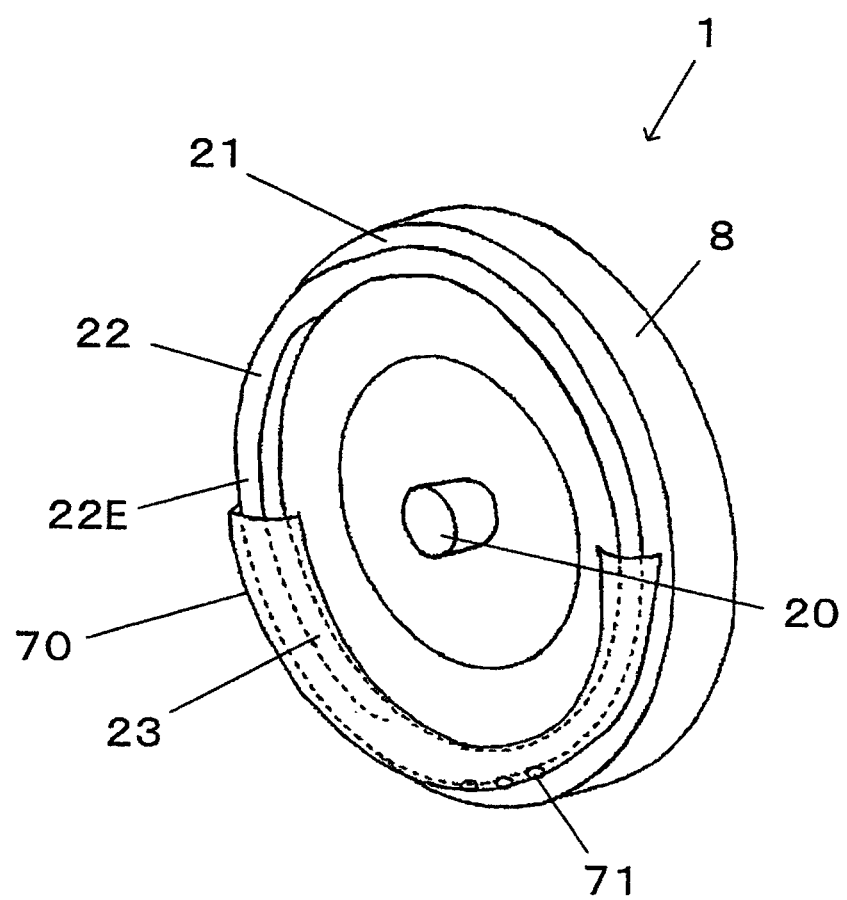
FIG. 19 is a perspective view showing a ninth embodiment of the rotating electrical machine according to the present invention.

FIG. 19 is a perspective view showing the ninth embodiment of the rotating electrical machine according to the present invention. It is to be noted that in the figures, parts that are identical or corresponding to those in the first embodiment are designated by the same reference numerals, and their description will be curtailed.

In the present embodiment, a lid-like member that covers at least a part of the coil end 22E is provided.

As shown in FIG. 19, the lower half portion of the coil end 22E is covered with a semi-circular, lid-like member 70. After flowing down from the upper half portion of the coil end 22E along the coil end 22E, the cooling medium RF flows into the lid-like member 70 and is held by the lid-like member 70. The lid-like member 70 is provided with outlet vents 71 perforated in the lower portion thereof, and the cooling medium RF held in the lid-like member 70 is discharged after sufficiently cooling the coil end 22E. This allows the cooling performance to be increased.

Tenth Embodiment

The tenth embodiment of the rotating electrical machine according to the present invention will now be explained with reference to FIG. 20.

Figure 20:
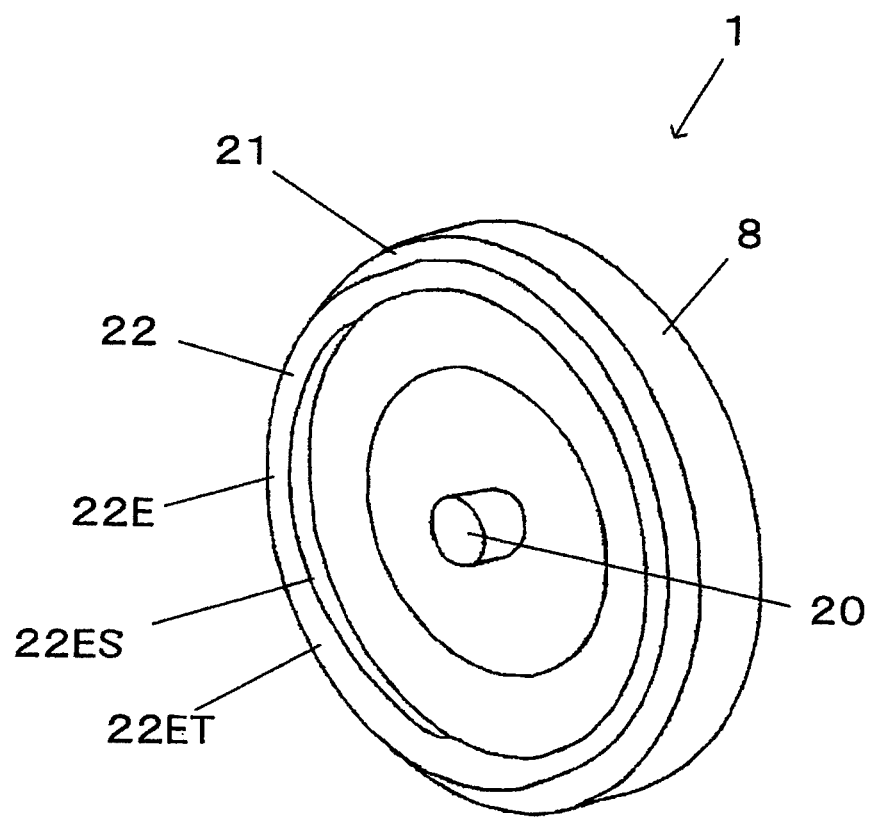
FIG. 20 is a perspective view showing a tenth embodiment of the rotating electrical machine according to the present invention.

FIG. 20 is a perspective view showing the tenth embodiment of the rotating electrical machine according to the present invention. It is to be noted that in the figure, parts that are identical or corresponding to those in the first embodiment are designated by the same reference numerals, and their description will be curtailed.

In the tenth embodiment, coating material is applied to the surface of the coil end 22E so as to improve the flow of the cooling medium RF. Now, an example in which the oil based cooling medium RF and a lipophilic coating material are used will be explained.

As shown in FIG. 20, a lateral surface 22ES of the coil end 22E is applied with a lipophilic coating material, so that the oil based cooling medium RF is guided along the lateral surface 22ES. More specifically, the lateral surface 22 ES of the coil end 22E is applied with a coating material having a higher lipophilicity than that of the coating material applied to the top end face. This allows the flow of the cooling medium RF to be improved by a very simple measure, thereby increasing the cooling effect.

It is to be noted that the rotating electrical machine of the tenth embodiment may be varied as follows.

(1) The highly lipophilic coating material may be applied to both of the inner circumference surface and the outer circumference surface of the coil end 22E or may be applied only to one of the surfaces.

(2) The flow of the refrigerant may be further improved by applying a hydrophilic coating material to a top end face 22ET of the coil end 22E.

(3) Application of a lipophilic coating material to the lateral surface 22ES can be omitted while a hydrophilic coating material is applied to the top end face 22ET of the coil end 22E.

While in the above embodiments, a rotating electrical machine with an inner rotor is explained, the present invention may also be applied to a rotating electrical machine with an outer rotor.

Although the variety of embodiments and examples of variations are described above, the present invention is not to be limited only to those contents. The scope of the present invention includes other possible embodiments invented within the scope of the technical idea of the present invention.

The disclosure of the following priority application is herein incorporated by reference: Japanese Patent Application No. 2009-178119 filed on Jul. 30, 2009.

The invention claimed is:

1. A rotating electrical machine, comprising:
a stator that includes a stator core and a stator coil;
a rotor that rotates with respect to the stator;
a refrigerant supply port through which a cooling medium is supplied to a coil end protruding from the stator core; and
a guide member, disposed along at least a part of the coil end, for causing the cooling medium supplied through the refrigerant supply port to flow along the coil end, wherein:
the guide member has a substantially semi-circular first guide member opening downward and a substantially semi-circular second guide member opening upward,
the first guide member is disposed along an inner circumference of the upper half portion of the coil end,
the second guide member is disposed along an outer circumference of the lower half portion of the coil end, and
the width of the first guide member that is substantially equal to the inner circumference diameter of the stator coil is less than the width of the second guide member that is substantially equal to the outer circumference diameter of the stator coil.

2. A rotating electrical machine according to claim 1, wherein:
a rotating shaft of the rotor is placed horizontally; and
above a horizontal plane including the rotating shaft, the guide member is disposed on at least a part of an inner circumference side of the coil end, and below the horizontal plane including the rotating shaft, the guide member is disposed on at least a part of an outer circumference side of the coil end.

3. A rotating electrical machine according to claim 1, wherein:
the guide member is formed of an insulation paper that insulates between the stator core and the stator coil.

4. A rotating electrical machine according to claim 1, wherein:
a guide groove for guiding a flow of the cooling medium in a circumferential direction is formed on a surface of the guide member.

5. A rotating electrical machine according to claim 1, wherein:
the stator coil is wound on a tooth of the stator core through a bobbin;
a flange extending in a rotation axis direction of the rotor is formed at an axial end of the bobbin; and
an end portion of the flange is bent in a radial direction of the rotor so as to form the guide member.

6. A rotating electrical machine according to claim 5, wherein:
a rotating shaft of the rotor is placed horizontally;
above a horizontal plane including the rotating shaft, the guide member is formed by bending radially outward the flange that is arranged radially inward of the coil end; and
below the horizontal plane including the rotating shaft, the guide member is formed by bending radially inward the flange that is arranged radially outward of the coil end.

7. A rotating electrical machine, comprising:
a stator that includes a stator core and a stator coil;
a rotor that rotates with respect to the stator; and
a refrigerant supply port through which an oil based cooling medium is supplied to a coil end protruding from the stator core, wherein:
at least one of an inner circumference surface and an outer circumference surface of the coil end is applied with a coating material having a higher lipophilicity than that of a coating material applied to a top end face of the coil end.

* * * * *